United States Patent
King et al.

(10) Patent No.: US 7,050,017 B2
(45) Date of Patent: May 23, 2006

(54) RFID TIRE BELT ANTENNA SYSTEM AND METHOD

(76) Inventors: Patrick F. King, 418 N. Park Blvd., Glen Ellyn, IL (US) 60137; Ian J. Forster, 31 Great Cob, Chelmsford (GB) CM1 6LA ( * ) Notice: Subject to any disclaimer, the term of this patent is extended or adjusted under 35 U.S.C. 154(b) by 507 days.

(21) Appl. No.: 10/223,065

(22) Filed: Aug. 14, 2002

(65) Prior Publication Data
US 2005/0093761 A1     May 5, 2005

(51) Int. Cl.
*H01Q 1/40*      (2006.01)
*B60C 9/00*      (2006.01)

(52) U.S. Cl. .................... 343/873; 152/152.1
(58) Field of Classification Search ............... 343/866, 343/873, 717, 711–712; 152/152
See application file for complete search history.

(56) References Cited

U.S. PATENT DOCUMENTS

| | | | |
|---|---|---|---|
| 4,021,705 A | 5/1977 | Lichtblau | 361/402 |
| 4,160,971 A | 7/1979 | Jones et al. | 340/152 |
| 4,529,961 A | 7/1985 | Nishimura et al. | 340/58 |
| 4,609,905 A | 9/1986 | Uzzo | 340/58 |
| 4,816,802 A | 3/1989 | Doerksen et al. | 340/447 |
| 4,911,217 A * | 3/1990 | Dunn et al. | 152/152.1 |
| 5,032,823 A | 7/1991 | Bower et al. | 340/568 |
| 5,181,423 A | 1/1993 | Philipps et al. | 73/724 |
| 5,181,975 A | 1/1993 | Pollack et al. | 152/152.1 |
| 5,218,861 A * | 6/1993 | Brown et al. | 73/146.5 |
| 5,319,354 A | 6/1994 | Myatt | 340/572 |
| 5,347,280 A | 9/1994 | Schuermann | 342/42 |
| 5,348,067 A * | 9/1994 | Myatt | 152/152.1 |
| 5,403,222 A | 4/1995 | Koenig et al. | 446/220 |
| 5,463,374 A | 10/1995 | Mendez et al. | 340/442 |
| 5,473,938 A | 12/1995 | Handfield et al. | 73/146.5 |
| 5,479,171 A | 12/1995 | Schuermann | 342/44 |
| 5,500,065 A * | 3/1996 | Koch et al. | 156/123 |
| 5,541,574 A | 7/1996 | Lowe et al. | 340/447 |
| 5,562,787 A * | 10/1996 | Koch et al. | 156/64 |
| 5,675,314 A | 10/1997 | Chaklader | 340/443 |
| 5,731,516 A | 3/1998 | Handfield et al. | 73/146.5 |
| 5,731,754 A | 3/1998 | Lee, Jr. et al. | 340/447 |
| 5,745,039 A | 4/1998 | Hof et al. | 340/590 |
| 5,844,130 A | 12/1998 | Hilgart et al. | 73/146.5 |
| 5,936,155 A | 8/1999 | Francois et al. | 73/129 |
| 5,939,977 A | 8/1999 | Monson | 340/442 |
| 5,969,239 A | 10/1999 | Tromeur et al. | 73/146.5 |
| 5,977,870 A * | 11/1999 | Rensel et al. | 340/447 |
| 6,016,127 A | 1/2000 | Casiola et al. | 343/731 |
| 6,028,503 A | 2/2000 | Preishuberpflugl et al. | 340/10.4 |
| 6,043,746 A | 3/2000 | Sorrells | 340/572.7 |
| 6,062,072 A | 5/2000 | Mock et al. | 73/146.5 |

(Continued)

FOREIGN PATENT DOCUMENTS

EP      0875405 B      11/1998

(Continued)

Primary Examiner—Shih-Chao Chen
Assistant Examiner—Hung Tran Vy
(74) Attorney, Agent, or Firm—Christensen O'Connor Johnson Kindness PLLC (57) ABSTRACT

The invention relates to a RFID chip that is contained inside a rubber tire to provide wireless communication of information concerning the tire. For instance, it may be desirable to communicate pressure and temperature information concerning a tire during its manufacture and/or usage. The RFID chip is attached to the inside of the rubber tire and is capacitvely coupled to a conductive belt contained inside the tire to provide an antenna for radio-frequency communications and reception.

32 Claims, 8 Drawing Sheets

U.S. PATENT DOCUMENTS

| | | | | |
|---|---|---|---|---|
| 6,087,930 A * | 7/2000 | Kulka et al. | | 340/447 |
| 6,140,974 A | 10/2000 | Dalley | | 343/806 |
| 6,147,659 A * | 11/2000 | Takahashi et al. | | 343/866 |
| 6,169,480 B1 | 1/2001 | Uhl et al. | | 340/442 |
| 6,208,244 B1 | 3/2001 | Wilson et al. | | 340/447 |
| 6,257,289 B1 | 7/2001 | Tomita et al. | | 152/152.1 |
| 6,278,363 B1 * | 8/2001 | Bezek et al. | | 340/442 |
| 6,278,413 B1 | 8/2001 | Hugh et al. | | 343/818 |
| 6,285,342 B1 | 9/2001 | Brady et al. | | 343/895 |
| 6,304,172 B1 | 10/2001 | Katou et al. | | 340/445 |
| 6,342,295 B1 | 1/2002 | Kobayashi | | 428/323 |
| 6,350,791 B1 | 2/2002 | Feichtmeier et al. | | 522/81 |
| 6,359,444 B1 | 3/2002 | Grimes | | 324/633 |
| 6,362,731 B1 | 3/2002 | Lill | | 340/445 |
| 6,368,707 B1 | 4/2002 | Kamiya et al. | | 428/349 |
| 6,388,567 B1 | 5/2002 | Bohm et al. | | 340/442 |
| 6,424,315 B1 | 7/2002 | Glenn et al. | | 343/895 |
| 6,429,831 B1 | 8/2002 | Babb | | 343/895 |
| 6,463,798 B1 | 10/2002 | Neikerk et al. | | 73/146.2 |
| 6,474,380 B1 | 11/2002 | Rensel et al. | | 152/152.1 |
| 6,480,110 B1 | 11/2002 | Lee et al. | | 340/572.5 |
| 6,501,435 B1 * | 12/2002 | King et al. | | 343/795 |
| 6,581,657 B1 * | 6/2003 | Brown | | 152/152.1 |
| 6,724,301 B1 * | 4/2004 | Ginman et al. | | 340/447 |
| 2001/0002451 A1 | 5/2001 | Breed | | 701/36 |
| 2001/0008083 A1 | 7/2001 | Brown | | 73/146 |
| 2002/0008632 A1 | 1/2002 | Clothier | | 340/825.37 |
| 2004/0017321 A1 * | 1/2004 | Benedict et al. | | 343/741 |
| 2004/0027241 A1 * | 2/2004 | Forster | | 340/445 |

FOREIGN PATENT DOCUMENTS

WO      WO0207496 A      1/2002

* cited by examiner

RFID TIRE BELT ANTENNA SYSTEM AND METHOD

FIELD OF THE INVENTION

The present invention relates to a system and method of wirelessly communicating information concerning a tire using radio-frequency communication.

BACKGROUND OF THE INVENTION

The operation of vehicle tires depends on environmental conditions that exist during both the manufacturing process and during normal usage. For example, rubber that is used make a tire is subjected to extreme temperatures during the molding process. If the temperature is not maintained within a certain range, the tire may include a design defect causing the tire to not operate properly. Environmental conditions can also affect the performance of a tire. For example, if the tire pressure is too high or too low, it may cause the tire to rupture during usage. The tire temperature and ambient temperature surrounding the tire also affect its pressure.

In order to provide wireless communication to and from a tire, a RFID chip must be associated with the tire that will not interrupt the tire's operation or rotation. A RFID chip may be used for radio-frequency communications to and from a tire. A RFID chip, also sometimes referred to as a "transponder," is typically provided in an integrated circuit (IC) type package. The RFID chip contains pins, and one or more of the pins are dedicated to the connection of the RFID chip with an external antenna. The RFID chip must be attached somewhere inside the tire, and the RFID chip must be designed to receive radio-frequency communications from a transmitter that interrogates the RFID chip to retrieve information concerning the tire.

A RFID chip added to every tire adds direct manufacturing costs to the tire that in turn raise its retail price. Additional costs are incurred when an antenna is also provided with the RFID chip. In order to generate cost savings to make placement of RFID chips in tires a more viable proposition, techniques used to eliminate costs associated with the RFID chip, without sacrificing its performance or operation, become increasingly important.

SUMMARY OF THE INVENTION

The present invention relates to a RFID chip that is attached to the inside of a tire containing conductive belts. The RFID chip capacitively couples to the conductive belts to form an antenna for radio-frequency communications concerning the tire, such as pressure or temperature information. Since the conductive belt inside the tire is used to provide the antenna for the RFID chip, it is not necessary to provide a separate antenna for the RFID chip to wirelessly communicate with an interrogation reader or other reception device.

The RFID chip contains a control system, communication electronics, and an antenna to wirelessly communicate with an interrogation reader. The RFID chip, in one embodiment, is packaged in an integrated circuit containing external pins for external connections. At least one pin is an antenna pin for connection to an external antenna.

A tire is formed by an elongated planar rubber surface having an inner side and an outer side forming a circular shape, wherein the rubber surface comprises a first outer edge and a second outer edge opposite of the first outer edge. A first planar rubber side connects substantially perpendicular to the first outer edge to form a first inner wall. A second planar rubber side connects substantially perpendicular to the second outer edge to form a second inner wall. The elongated planar rubber surface has embedded within at least one conductive belt to add structural integrity to the tire. A RFID chip having at least one antenna pin is attached to the inner side of the tire. The planar rubber surface forms a dielectric between the conductive belt and the RFID chip. At least one antenna pin on the RFID chip is capacitively coupled to the conductive belt to form an antenna for radio-frequency signal communication to and from the RFID chip concerning the tire.

The tire may contain a plurality of conductive belts. The RFID chip may couple to one portion of the conductive belts to form a monopole antenna, or to more than one portion of the conductive belts to form a dipole antenna. The conductive belts may also form a slot that is capacitively coupled to the RFID chip to form a slot antenna.

In another embodiment, at least one conductive element is attached to the RFID chip and/or its pin. The conductive element is capacitively coupled to the plurality of conductive belts to maximize the coupling between the RFID chip and the conductive belts. The conductive components may be shaped in any form, including but not limited to a bow tie arrangement, and may be symmetrically or asymmetrically arranged with respect to each other.

Further, an electric field generator may be used to generate an electric field across the slot formed by the gaps in between the plurality of conductive belts to allow the RFID chip to operate at lower frequencies.

In another embodiment, the conductive components are asymmetrically arranged with respect to each other and are capacitively coupled to the plurality of conductive belts. The RFID chip is adapted to receive a signal having a first operating frequency using coupling of the conductive components to the plurality of belts to form a slot antenna. The RFID chip is also adapted to receive a signal having a second operating frequency when the conductive components receive a signal that causes the conductive components to act as a pole antenna.

In another embodiment, the RFID chip is coupled across a slot formed in between one or more conductive belts and a bead on the tire to form a slot antenna. The gap between the belts and the slot also forms a transmission line for transmitting a received electric signal around the path to reach the RFID chip if the RFID chip is not directly in the path of the electric signal.

DETAILED DESCRIPTION OF THE INVENTION

The present invention is directed to a system and method of attaching a RFID chip to a tire to wirelessly communicate information about the tire, such as pressure and temperature information. Most RFID chips are provided in the form of an integrated circuit (IC). The RFID chip typically contains a plurality of pins external to the IC package. The pins may be used for power and ground, if the RFID chip is powered from an external source, antenna connections, or any other external connection required. Different RFID chips have different pin configurations and are designed to connect to different types of external devices for various reasons. Any type of RFID chip, whether it be externally powered, internally powered, or not containing its own power source, may be used with the present invention.

Figure 1:
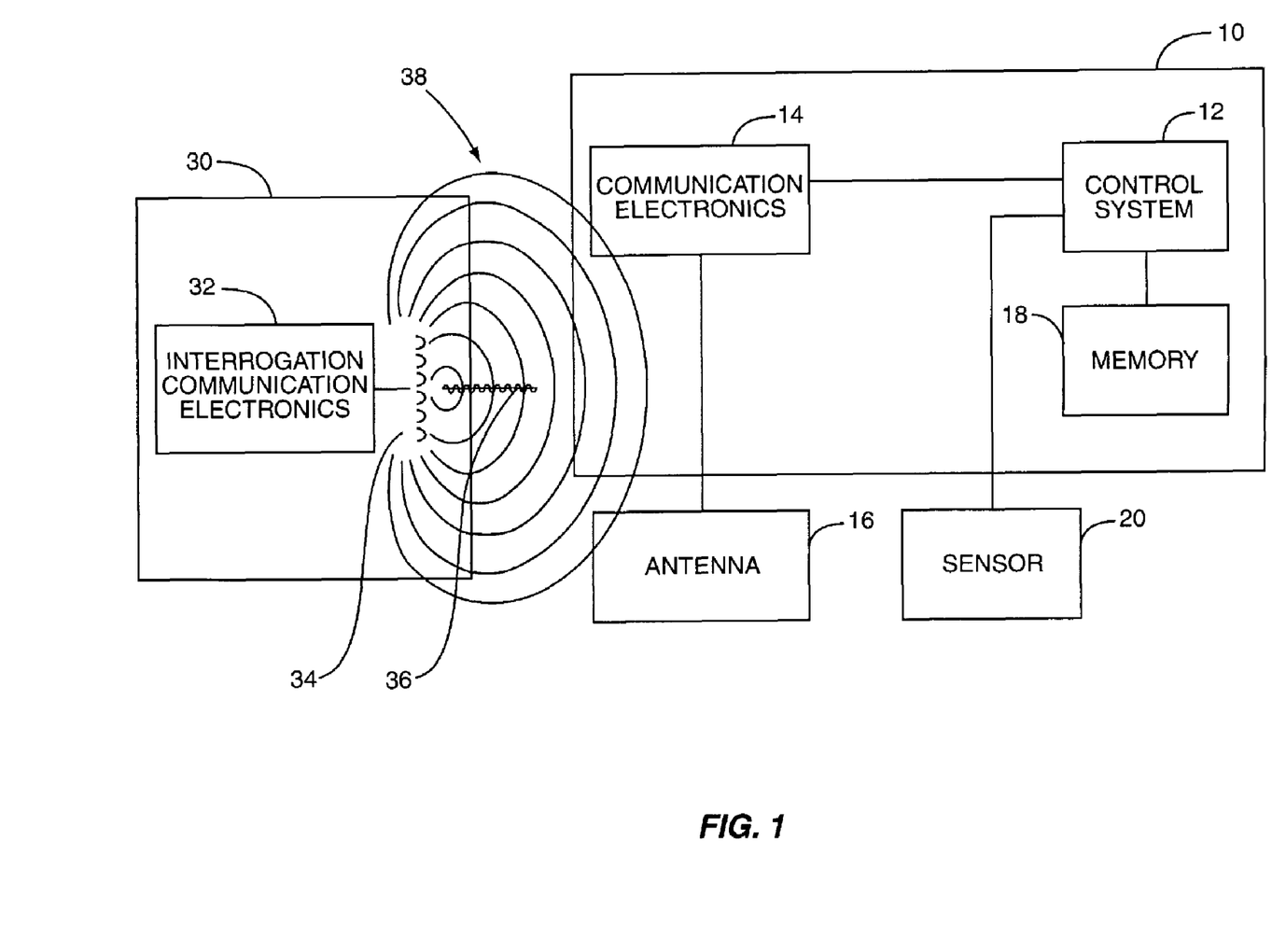
FIG. 1 is a schematic diagram illustrating communication between a RFID chip and an interrogation reader.

Before discussing the particular aspects of the present invention, a general description of the RFID chip and its wireless communication follows. As illustrated in FIG. 1, a RFID chip 10 is provided for electronic communication. A RFID chip 10, as used herein, means any type of electronic circuit that allows radio-frequency communication of information. Some RFID chips 10 have both a transmitter and receiver. Other RFID chips 10, sometimes called "transponders," are interrogated by interrogation reader 30, whereby the RFID chip 10 communicates back by altering field 38 containing an interrogation signal 36. This description refers to the terms "transponder" and the RFID chip 10 interchangeably, and the use of the term transponder is not intended to limit the type of RFID chip 10 applicable to the present invention. RFID chips 10 are available that communicate at various frequencies, including UHF and VHF. One embodiment of the present invention uses a RFID chip 10 that is a passive radio-frequency device with the ability to rectify incoming radio energy and provide power to the device for communication and operation. The invention is also applicable to active devices that have their own power source for communications. It should be readily understood to one of ordinary skill in the art that there are many other different types of RFID chips 10 that allow electronic communication and thus the present invention is not limited to any one particular type.

The RFID chip 10 includes a control system 12 and communication electronics 14. The RFID chip 10 may also contain memory 18 for storage of information to be communicated to an interrogation reader 30. Alternatively, the RFID chip 10 may store information such as an identification number or other information by using diodes, dip-switches or some other like circuitry in lieu of erasable memory 18. An antenna 16 is provided to receive the interrogation signal 36 from the interrogation reader 30. The antenna 16 may be either external to or internal to the RFID chip 10. The particular type and location of the antenna 16 will depend on the operating frequency of the RFID chip 10 and the particular design desired. The RFID chip 10 may also be connected to sensor 20 for sensing ambient or environmental information surrounding the RFID chip 10, such as pressure or temperature. The data read from the sensor 20 may be stored in memory 18 by the control system 12.

One example of the sensor 20 may be a pressure sensor like that described in U.S. Pat. No. 5,675,314 entitled "Tire pressure sensor," incorporated herein by reference its entirety. Another example of the sensor 20 may be a temperature sensor like that described in U.S. Pat. No. 5,731,754 entitled "Transponder and sensor apparatus for sensing and transmitting vehicle tire parameter data," incorporated herein by reference its entirety. It should be noted that the sensor 20 may be any type of sensor that senses environmental information, including but not limited to pressure, tire temperature, ambient temperature, humidity, etc.

The antenna 16 receives the signal 36 through the radiated interrogation field 38. The antenna 16 passes the received signals 36 to the communication electronics 14. The communication electronics 14 contain circuitry necessary to interpret the signal 36 from the field 38, demodulate the signal 36, and communicate the demodulated signal to the control system 12. The control system 12 is an integrated circuit, printed circuit board, or other type of microprocessor or micro-controller electronics that controls the operations of the RFID chip 10. The control system 12 is connected to the communication electronics 14 to communicate and receive transmissions. The control system 12 is also connected to memory 18 for storing and retrieving information. The control system 12 determines if any actions are needed in response to the communications received from the communication electronics 14.

FIG. 1 also depicts how communication is achieved with the RFID chip 10 using an interrogation reader 30. The interrogation reader 30 contains an interrogation communication electronics 32 and an interrogation antenna 34. The interrogation reader 30 communicates with the RFID chip 10 by emitting an electronic signal 36 modulated in a frequency by interrogating the communication electronics 32 through the interrogation antenna 34. The interrogation antenna 34 may be any type of antenna that can radiate the signal 36 through a field 38 so that a compatible device, such as the RFID chip 10, can receive such signal 36 through its own antenna 16. The field 38 could be electromagnetic, magnetic, or electric. The signal 36 is a message containing information or a specific request for the RFID chip 10.

When the antenna 16 is in the presence of the field 38 emitted by the interrogation reader 30, the communication electronics 14 are energized by the signal 36, thereby energizing the RFID chip 10. The RFID chip 10 remains energized so long as the antenna 16 is in the field 38 of the interrogation reader 30. The communication electronics 14 demodulates the signal 36 and sends the message containing information or request to the control system 12 for appropriate actions. For example, the request may be for the RFID chip 10 to communicate its identification, or information about a material or package containing the RFID chip 10, such as date of manufacture, place of manufacture, and/or lot number. The message may also be a request for information regarding ambient or environmental measurements sensed by the sensor 20.

Another description of a RFID chip 10 that may be used with the present invention is located in U.S. Pat. No. 5,347,280, entitled "Frequency diversity transponder arrangement," incorporated herein by reference in its entirety. The RFID chip 10 is one type of RFID chip. Other types of RFID chips 10 may be used with the present invention. For instance, the RFID chip 10 may have a transmitter that can send information to the interrogation reader 30 without having to alter the signal 36. The RFID chip 10 may contain a battery to power the transmitter, or an energy storage unit that is charged by energy received from the signal 36 when the RFID chip 10 is in the range of the field 38. It is readily understood to one of ordinary skill in the art that there are many other types of wireless communications devices and communication techniques than those described herein, and the present invention is not limited to a particular type of device, technique or method.

Figure 2:
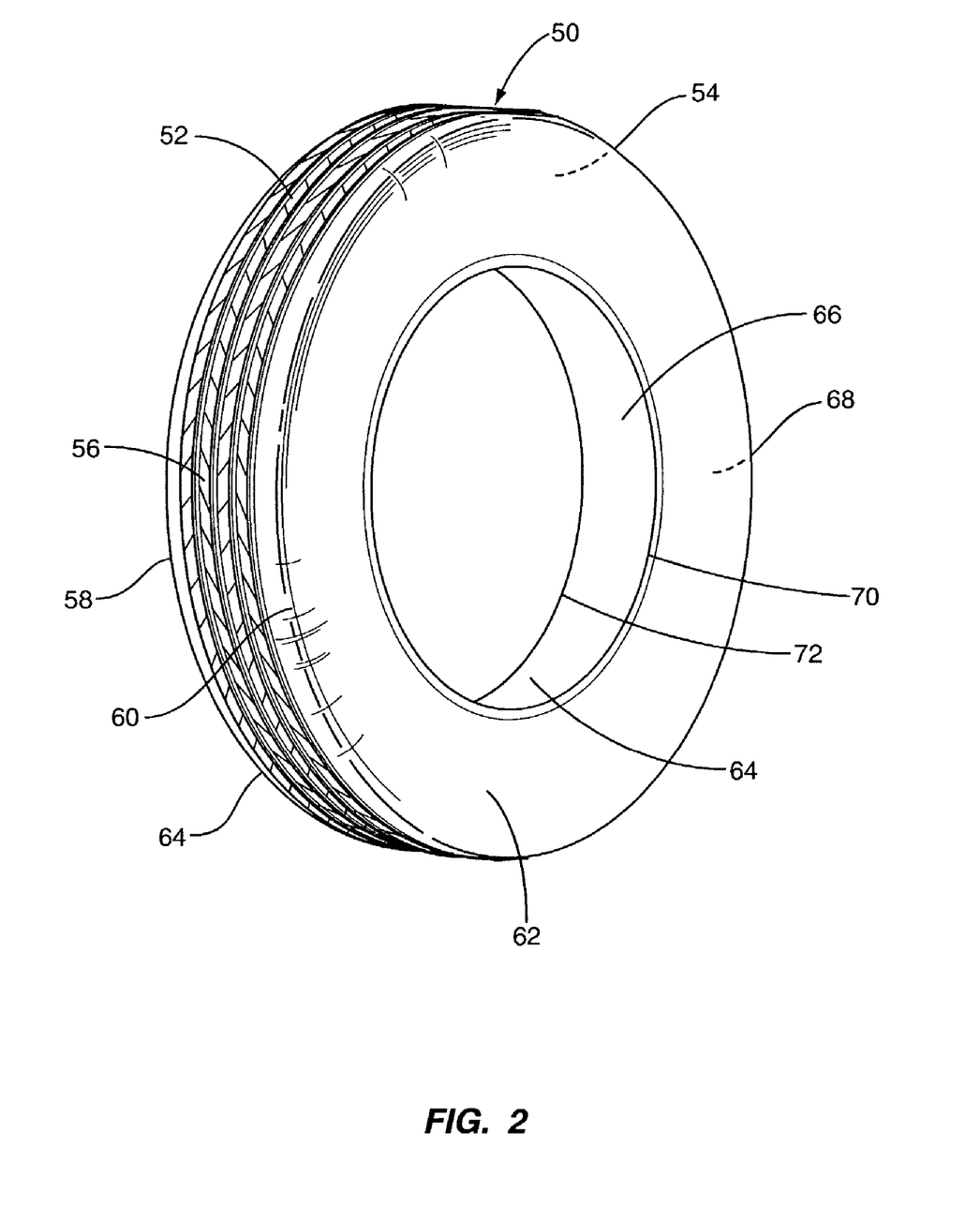
FIG. 2 is a schematic diagram of a tire.

FIG. 2 illustrates a typical tire that may be used in the present invention. A tire 50 is comprised of an elongated planar surface 52 that is comprised of a rubber material. The elongated planar rubber surface 52 typically contains a tread. The elongated planar rubber surface 52 is shaped in the form of a circle to form an inner side 54 and an outer side 56. The inner side 54 is the surface on the inside of the circular shape formed by the circular structure of the elongated planar rubber surface 52. The outer side 56 is the side of the elongated planar rubber surface 52 that is projected outward from the circular shape. The elongated planar rubber surface 52 has two outer edges opposite from each other. One edge is the first outer edge 58, and the other edge is the second outer edge 60. In order to form a tire that can be placed around a vehicle rim (not shown) and placed under pressure, a first planar rubber surface 62 and a second planar rubber surface 64 are attached to the elongated planar rubber surface 52. The first planar rubber surface 62 connects substantially perpendicular to the first outer edge 58 to form a first inner wall 66. The second planar rubber surface 64 also connects substantially perpendicular to the second outer edge 60 to form a second inner wall 68. When the tire is place around a rim (not shown), the first inner circular edge 70 and second inner circular edge 72 formed by the outer edge of the first planar rubber surface 62 and second planar rubber surface 64, respectively, form a seal at the vehicle rim. In this manner, when air is placed inside the tire 50, the air is trapped under pressure inside the tire 50 between the rim and inside of the inner area of the tire such that the tire can support a weight, such as a vehicle.

Figure 3:
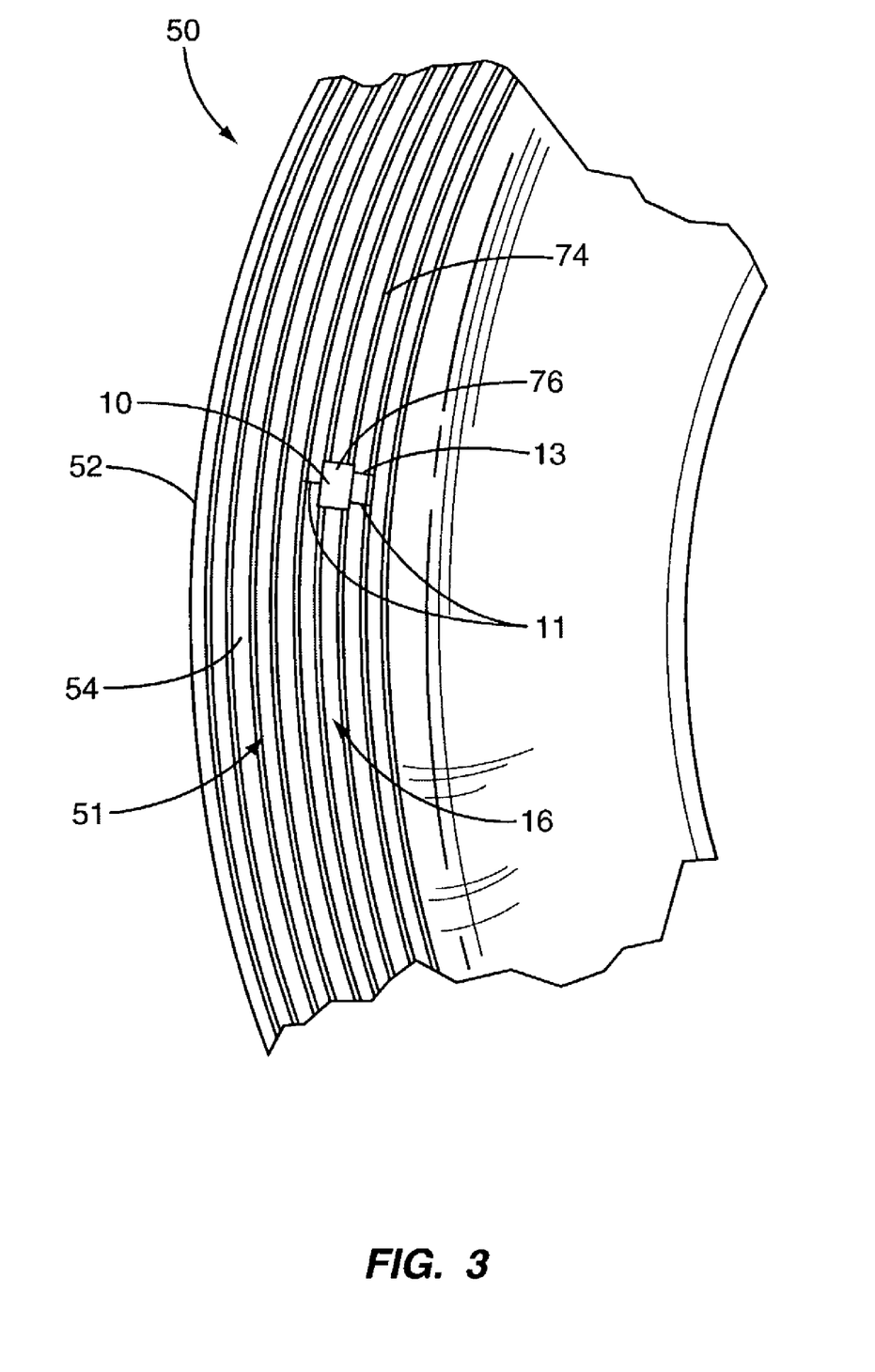
FIG. 3 is a schematic diagram of the inside of a tire and a RFID chip capacitively coupled to gaps that form slots between conductive belts inside the tire to form a pole antenna.

FIG. 3 illustrates an inside portion 51 of the tire 50. The elongated planar rubber surface 52 contains at least one conductive belt 74 inside the rubber to provide structural integrity and support. In most tires 50, the conductive belt 74 is provided as a plurality of belts 74. The RFID chip 10 is placed in the inner side 54 of the tire 50 in proximity to the belts 74. The belts 74 may run in lengths parallel to the tire, as shown in FIG. 3, or the belts 74 may run in diagonal directions. Further, the tire 50 may contain multiple layers of belts 74 where one set of belts 74 in one layer runs in a direction that crosses with the direction of the belts 74 in another layer.

The RFID chip 10 may be like that described in U.S. Pat. No. 6,501,435 entitled "Wireless communication device and method," which is a continuation-in-part of U.S. Pat. No. 6,483,473 entitled "Wireless communication device and method." Both of these disclosures are incorporated herein by reference in their entireties.

An adhesive 76 may be used to adhesively attach the RFID chip 10 to the inner side 54. The RFID chip 10 contains several pins, including a antenna pins 11 and a ground pin 13. Because of the close proximity of the antenna pins 11, when the RFID chip 10 is attached to the inner side 54 of the tire 50, the antenna pins 11 are capacitively coupled to the conductive belt 74. This causes the RFID chip 10 to capacitively couple to one or more belts 74 to provide an antenna 16 formed by the belts 74. In this manner, the RFID chip 10, using antenna 16, can wirelessly communicate radio frequency communication signals to the interrogation reader 30. Note, that the RFID chip 10 may be placed anywhere on the tire 50 or in proximity to the belts 74 in order for the belts 74 to act as an antenna 16, and exact placement is not important so long as there is capacitive coupling between the pins 11 and the belts 74.

It should be noted that if only one conductive belt 74 is inside the tire 50, or only one conductive belt 74 is close enough for the RFID chip 10 to capacitively couple to the belt 74, the conductive belt 74 itself may provide the antenna 16. If only one antenna pin 11 is present on the RFID chip 10, the coupling of the one antenna pin 11 to the conductive belt 74 may provide a monopole antenna 16 arrangement. If two antenna pins 11 are provided, both antenna pins 11 capacitively couple to the gap 78 and/or the conductive belt 74 to provide a dipole antenna 16 arrangement. The RFID chip 10 may be further grounded to a ground plane (not shown). The ground plane (not shown) may be provided between the RFID chip 10 and the surface of the tire 50.

It should also be noted that the conductive belt 74 can be one or more conductive belts 74, and may be comprised from any type of conductive material including but not limited to steel, iron and aluminum. The RFID chip 10 may contain one or more antenna pins 11. Using the conductive belt 74 or gaps 78 as an antenna 16, the RFID chip 10 may operate at different operating frequencies according to the length and design of the conductive belts. For instance, the conductive belts may be capacitively coupled to the RFID chip 10 so that the RFID chip 10 has an operating frequency of 13.56 MHz, 915 MHz, or 2.45 GHz, for example. Also, the RFID chip 10 may be coupled to the first inner wall 66 or second inner wall 68 of the tire 50 if either the first inner wall 66 (not shown in FIG. 3) or second inner wall 68 (not shown in FIG. 3) contains at least one conductive belt 74. The RFID chip 10 may be placed in a position on the first inner wall 66 or second inner wall 68 such that the antenna pin 11 of the RFID chip 10 is close enough to the conductive belt 74 in the elongated planar rubber surface 52 of the tire 50 to establish a capacitive coupling. However, placement of the RFID chip 10 in different regions of the elongated planar rubber surface 52 on the first inner wall 66 or second inner wall 68 may affect the performance and operating frequency of the antenna 16 that is formed by capacitively coupling the antenna pin 11 to the RFID chip 10. Empirical testing may be required to fine-tune the performance of the antenna 16 to the desired application.

The antenna pins 11 may also be one or more conductive tabs, as described in previously-referenced U.S. Pat. Nos. 6,501,435 and 6,483,473.

Figure 4:
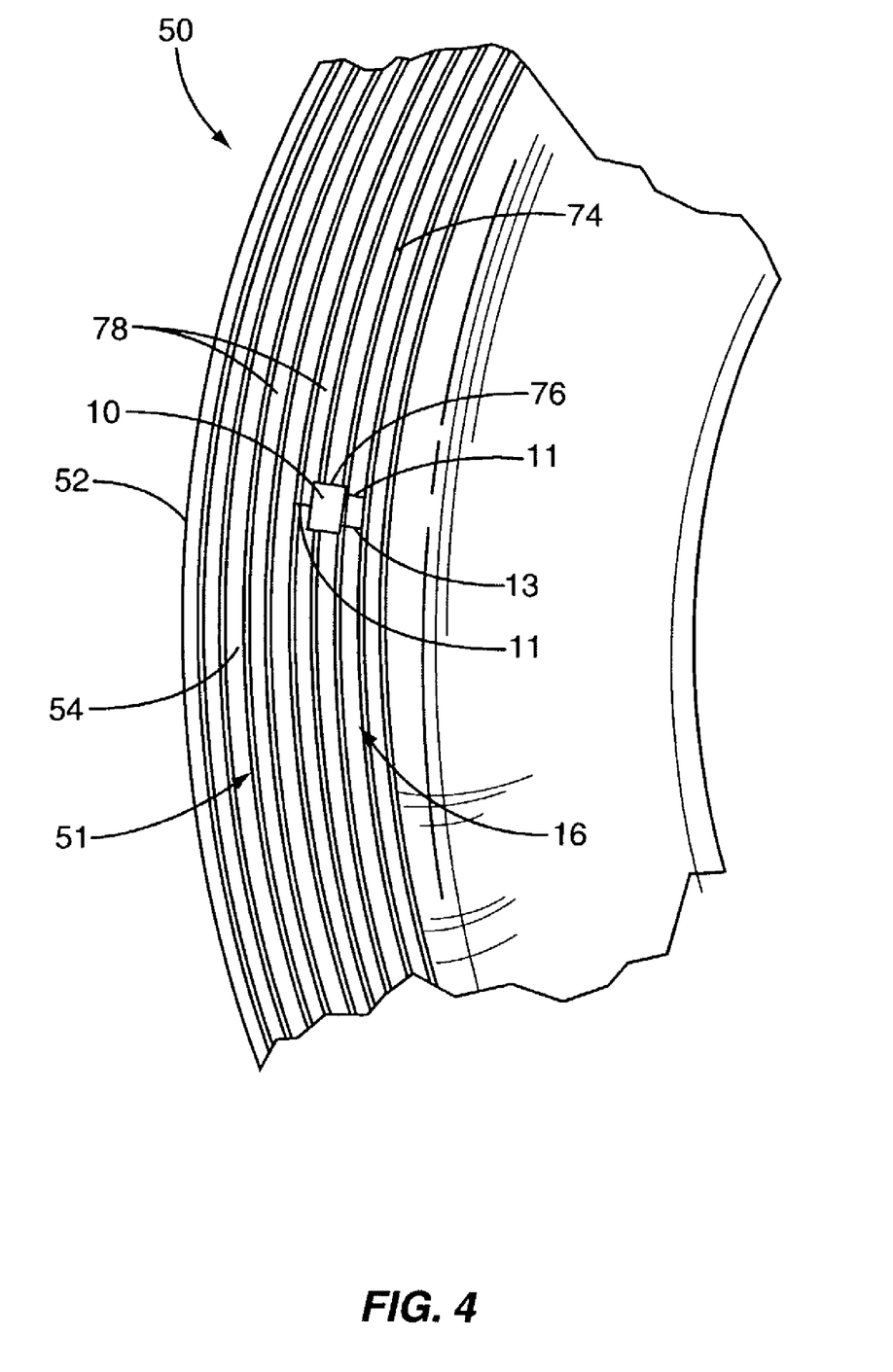
FIG. 4 is a schematic diagram of the inside of a tire and a RFID chip capacitively coupled to bounded slots formed by conductive belts inside the tire to form a slot antenna.

FIG. 4 illustrates an alternative embodiment of the present invention. A plurality of conductive belts 74 form a gap 78, as illustrated in FIG. 4. The gap 78 may act as a bounded slot 78. Although the slot 78 in FIG. 4 is shown in solid outline, the slot 78 is embedded within the elongated planar rubber surface 52. The antenna pin 11 of the RFID chip 10 may capacitively couple to the slot 78 to form a slot antenna 16. In this manner, the RFID chip 10 can wirelessly communicate with interrogation reader 30 or other reception device using the capacitive coupling to the slot 78 to form a slot antenna 16. More information on slot antennas 16 can be found in U.S. Pat. No. 6,628,237 entitled "Remote communication using slot antenna," incorporated herein by reference in its entirety.

The conductive belts 74 can be considered as a series of parallel capacitors coupled conductively to each other. The slot 78 is self-terminating due to the cross-capacitance between the multiple conductive belts 74 in proximity to each other. In order to use the conductive belts 74 as a slot antenna 16, an electric field must be established at a point along the length of the slot 78 between two conductive belts 74 through the coupling of the RFID chip 10 to the belts 74. If the elongated rubber planar surface 52 that separates the RFID chip 10 and/or pin 11 from the slot 78 causes the RFID chip 10 or pin 11 to conductively couple insufficiently to the slot 78, it may be desirable to implement techniques that improve the performance of the coupling between the RFID chip 10 and/or pin 11 to the slot 78, consistent with achieving a matched impedance condition between the antenna 16 formed by the belts 74. Also, it may be desirable to short circuit, at RF frequencies, the belts 74 adjacent to each other on each side of the slot 78 coupled to the RFID chip 10 and/or pin 11 so that the RF current induced in the conductive surface of the belt 74 flows relatively unimpeded. A number of methods may be used to improve the performance of the coupling by varying the shape of the RFID chip 10 and/or adding additional conductive components of varying geometries to the pin 11 that is used to couple the pin 11 to the slot 78. For example, conductive tabs like those described in previously referenced U.S. Pat. No. 6,501,435 may be coupled to the pin 11 or pins 11 of the RFID chip 10, and the conductive tabs are then coupled to the belts 74 to provide the antenna 16.

As discussed previously, the RFID chip 10 may capacitively couple to the slot 78 using one antenna pin 11 or multiple antenna pins 11. The slot antenna 16 radiation pattern may be similar to a monopole type antenna or similar to a dipole type antenna, depending on the particular configuration. Further, the RFID chip 10 may be grounded to a ground plane.

Figure 5:
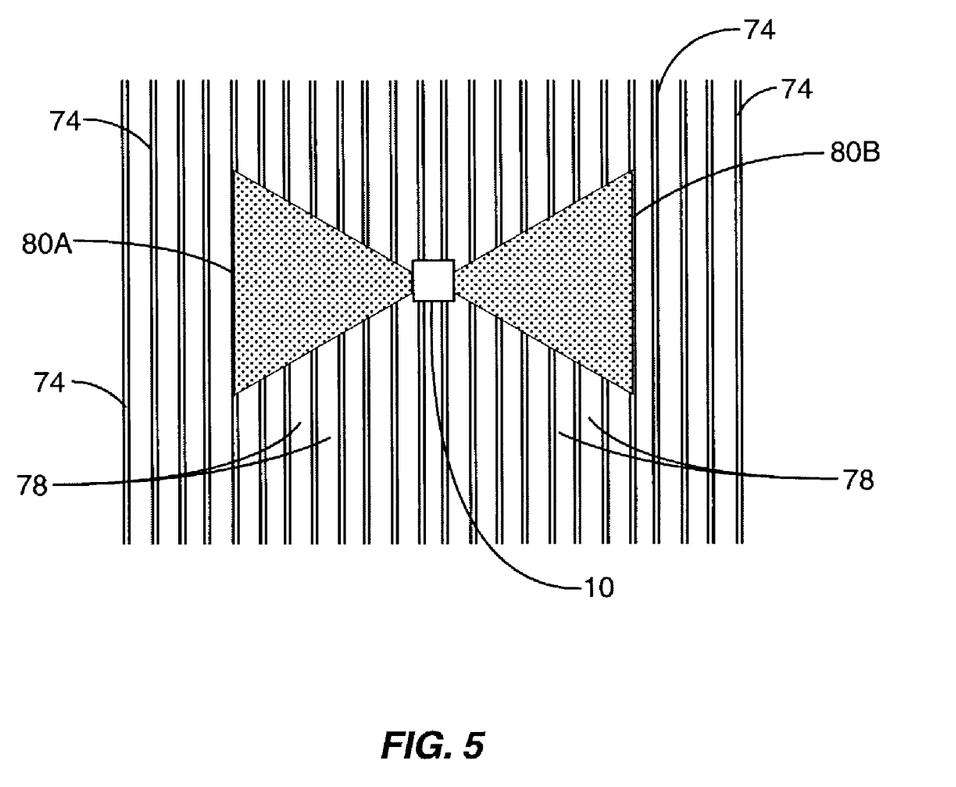
FIG. 5 is a schematic diagram of a plurality of conductive components coupled to the RFID chip to maximize coupling between the RFID chip and the conductive belts.

FIG. 5 illustrates one embodiment of the present invention where additional conductive components are coupled to the pins 11 of the RFID chip 10, and these conductive components are coupled to the belts 74. Two conductive components 80A, 80B are coupled to the RFID chip 10 and/or pins 11 in the form of a bow tie. The wider area of the conductive components 80A, 80B, away from the slot 78 position that is closest to the RFID chip 10, tends to couple to the belts 74 together at RF frequencies, making it easier for the RF current created by receipt of signal 36 to flow around a virtual slot. The virtual slot is formed by the plurality of slots between the sections of the belt 74. The two conductive components 80A, 80B forming a bow tie strongly coupling the belts 74 further away from the RFID chip 10 and providing weaker coupling between the belts 74 toward the RFID chip 10. The narrower area of the conductive components 80A, 80B, as they get closer to the RFID chip 10, tend to increase the impedance and therefore the electric field component of a flow current, thereby acting as an impedance matching section to the RFID chip 10. This creates a structure that behaves more like a continuous conductor with a single slot.

Various other conductive components 80 having various shapes can also be used that include a greater surface area farther from the RFID chip 10 and whose surface area decreases closer to the RFID chip 10, and the present invention is not limited to any particular structure for the conductive components 80.

Figure 6:
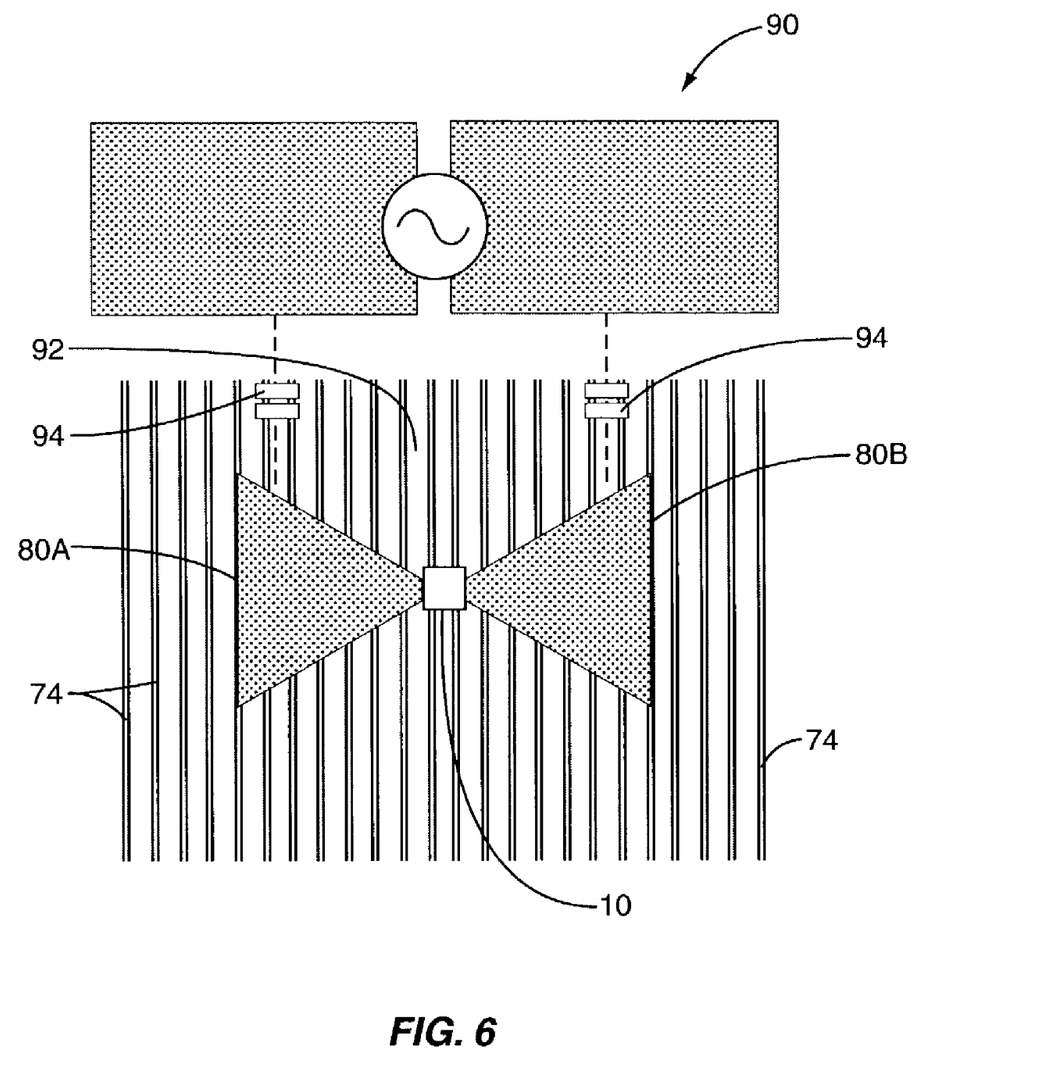
FIG. 6 is a schematic diagram of the embodiment illustrated in FIG. 5 where the conductive belts receive an electric field signal from an electric field generator to allow the RFID chip to operate at lower frequencies.

An alternative embodiment of that illustrated in FIG. 5 is illustrated in FIG. 6. The same UHF structure illustrated in FIG. 5 is also used in this embodiment. However, this same structure can also be used for the RFID chip 10 to operate as a low frequency tag by coupling to an electric field created by an electric field generator 90. The electric field generator 90 generates a high differential AC voltage across a slot 92 capacitively coupling the RFID chip 10 to the electric field. The electric field is generated in a direction parallel to the alignment of the belts 74 so as to not cause a shorting of the flux lines in the electric field that would prevent operation.

The capacitors 94 contained in FIG. 6 are not actually present, but are representations of the capacitive coupling between the electric field generator 90 and the RFID chip 10 and its conductive components 80A, 80B. The belts 74 inline with the slot 92 do not interact significantly with the electric field generated by the electric field generator 90, except that the belts 74 become charged by the voltage placed on the belts 74 via the capacitive coupling with the electric field generator 90.

Figure 7:
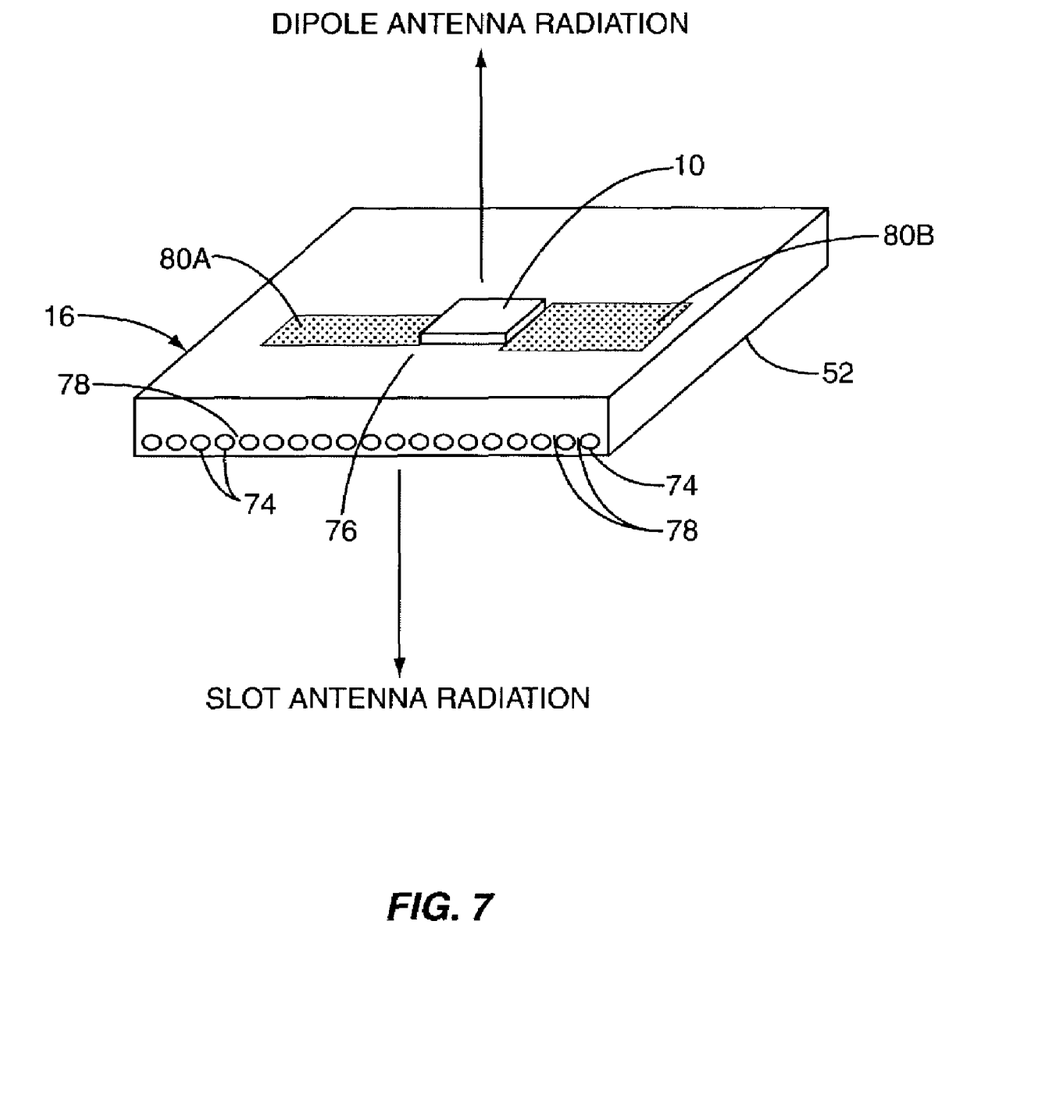
FIG. 7 is a schematic diagram of a RFID chip coupled to asymmetrically arranged conductive components attached to the RFID chip to allow the RFID chip to receive signals at different operating frequencies using the conductive components to form both a slot antenna and a dipole antenna.

FIG. 7 illustrates another embodiment of the present invention wherein the RFID chip 10 is configured to operate at two different operating frequencies. Impedance matching between the elongated planar rubber surface 52 and belts 74 to the RFID chip 10 can be considered to provide operation at dual frequencies. In FIG. 6, the RFID chip 10 is mounted on the inner side 54 of the tire 50, as previously described. However, the RFID chip 10 is designed so that the RFID chip 10 is impedance matched to the tire 50 and belts 74 at two different operating frequencies, thereby allowing the RFID chip 10 to respond to signals 36 having two different operating frequencies. Conductive components 80A, 80B are coupled to the RFID chip 10 and/or pins 11. The conductive components 80A, 80B are arranged asymmetrically to each other, for example in a manner as defined in previously referenced U.S. Pat. No. 6,501,435.

In a second mode of operation, when a signal 36 is radiated at a second operating frequency, the RFID chip 10 and its conductive components 80A, 80B act as an insert coupling to the gap 78 between the belts 74, wherein the gap 78 provides a slot 78 to act as a slot antenna 16. For example, the conductive components 80A, 80B and the belts 78 may be configured to couple to the slot 78 to form a slot antenna 16 when a signal 36 having an operating frequency of 915 MHz is received. It should be noted that the nature of the slot 78 formed by the parallel coupled belts 74, wherein the half wave slot 78 length is terminated by cross-capacitance, can be made to be very broadband by choice of appropriate impedance matching components. For example, the impedance matching components may be similar to those described in co-pending patent application Ser. No. 10/125,783, entitled "Multiple feed point slot antenna," filed on Apr. 18, 2002, and incorporated herein by reference in its entirety. Effectively, the slot 78 has a number of different lengths at which it self-terminates. Therefore, the RFID chip 10 may be configured to couple to the slots 78 at different operating frequencies to form different slot antennas 16 yielding more than two effective operating frequencies for the RFID chip 10. For example, the RFID chip 10 could be configured to operate at 869 MHz and 915 MHz using the various slot 78 lengths as different slot antennas 16, and 2.45 GHz using the conductive components 80A, 80B as a dipole antenna 16. Also, note that the present invention can be used with a single conductive component 80 to form a monopole antenna.

Figure 8:
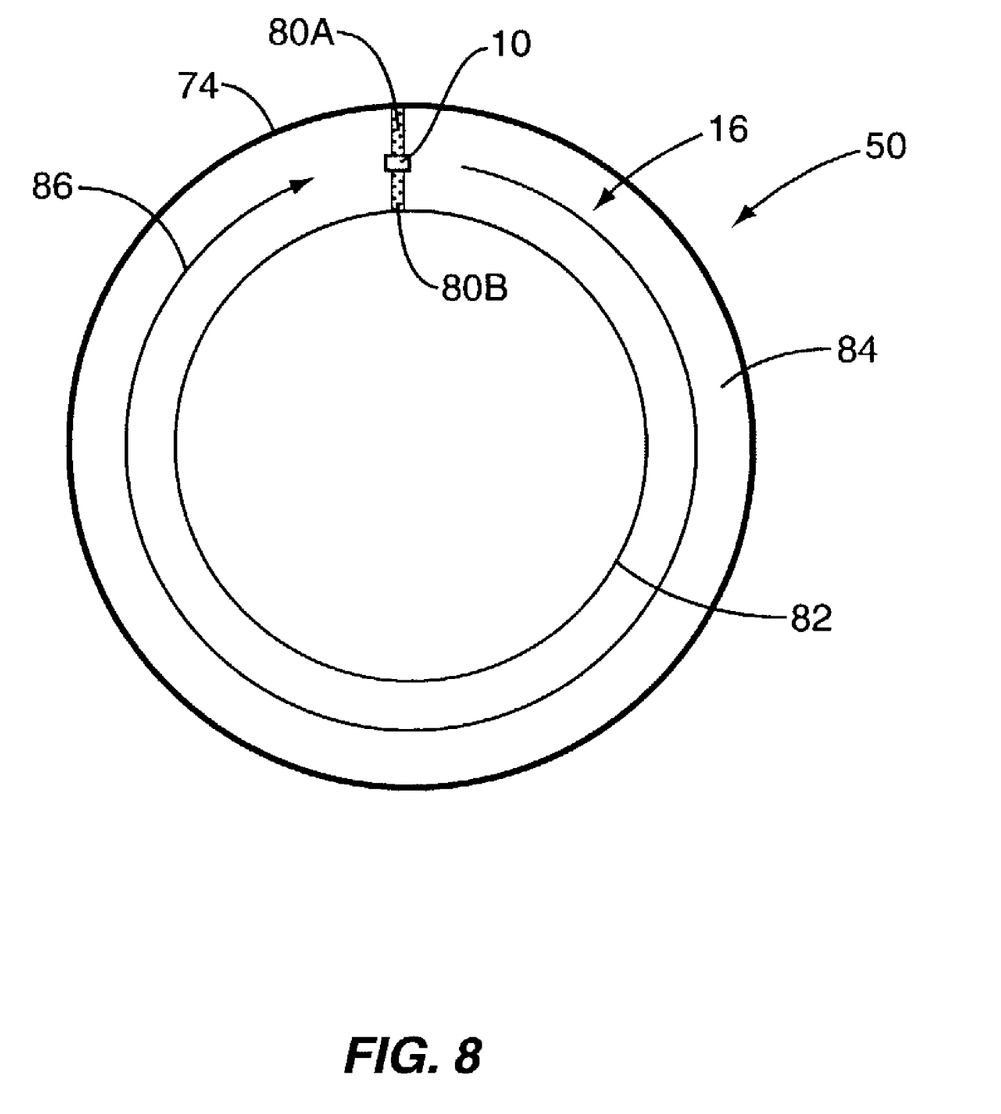
FIG. 8 is a schematic diagram of a RFID chip coupled to a gap formed between conductive belts and a tire bead to form a slot antenna and a transmission line for propagating a received electronic signal to the RFID chip.

FIG. 8 illustrates another embodiment of the present invention wherein the RFID chip 10 uses the tire 50 structure to form a slot antenna 16. The RFID chip 10 is coupled to two tire 50 conductive structures—the belt 74 and the bead 82. The bead 82 is a series of loops of wire designed to reinforce the tire edge in the area where it is mounted onto a wheel. The structure of the tire 50 is in the form of an annular slot 84, which is formed by the space between the belts 74 and the bead 82. A conductive component 80 may be coupled to the RFID chip 10 in order to couple to the slot 84 to form a slot antenna 16. The form of the slot 84 will dictate its operating frequency. At comparatively low operating frequencies, the slot 84 will act as a full wave or half wave antenna. At higher operating frequencies, the conductive component 80 can stimulate a harmonic mode of the slot 84.

Alternatively, the slot 84 can form a transmission line 86 that leaks into the environment surrounding the tire 50 to form an antenna 16. If the RFID chip 10 needs to be interrogated by an interrogation reader 30 or other transmission device on a vehicle, the signal 36 can be radiated into this transmission line 86 at any point around the tire 50, and the transmission line 86 propagates the signal 36 around the slot 84. Even though the tire 50 containing the RFID chip 10 is rotating, making it come in and out of the field 38 of the interrogation reader 30, the signal's 36 radiation into the transmission line 86 allows continuous communication between the interrogation reader 30 and the RFID chip 10.

Certain modifications and improvements will occur to those skilled in the art upon a reading of the foregoing description. It should be understood that the present invention is not limited to any particular type of RFID chip 10, its components, the interrogation reader 30, the tire 50, and its components. For the purposes of this application, couple, coupled, or coupling is defined as either directly connecting or reactive coupling. Reactive coupling is defined as either capacitive or inductive coupling. One of ordinary skill in the art will recognize that there are different manners in which these elements can provide to accomplish the present invention. The present invention is intended to cover what is claimed and any equivalents. The specific embodiments used herein are to aid in the understanding of the present invention, and should not be used to limit the scope of the invention in a manner narrower than the claims and their equivalents.

What is claimed is:

1. A system for communicating information wirelessly with a tire, comprising:
    a tire that includes:
        an elongated planar surface having an inner side and an outer side forming a circular shape, wherein said elongated planar surface comprises a first outer edge and a second outer edge opposite of said first outer edge;
        a first planar side that connects to said first outer edge to form a first inner wall; and
        a second planar side that connects to said second outer edge to form a second inner wall;
        said elongated planar surface having embedded within at least one conductive belt to add structural integrity to said tire; and
    a RFID chip having at least one antenna pin, wherein said RFID chip is attached to said inner side of said tire and wherein said elongated planar surface forms a dielectric between said at least one conductive belt and said RFID chip;
    said at least one antenna pin capacitively coupled to said at least one conductive belt to form an antenna for radio-frequency signal communication to and from said RFID chip.

2. The system of claim 1, wherein said at least one conductive belt is comprised of a plurality of conductive belts.

3. The system of claim 2, wherein said at least one antenna pin is two antenna pins that are capacitively coupled to said plurality of conductive belts to form a dipole antenna.

4. The system of claim 2, wherein said plurality of conductive belts form a slot wherein said at least one antenna pin is capacitively coupled to said slot to form a slot antenna.

5. The system of claim 4, further comprising at least one conductive component coupled to said pin and coupled to said slot to form said antenna.

6. The system of claim 5, wherein said at least one conductive component is two conductive components formed in the shape of a bow tie.

7. The system of claim 5, further comprising an electric field generator that generates an electric field across said slot to capacitively couple said electric field to said at least one conductive component.

8. The system of claim 5, further comprising an interrogation reader that sends an electronic signal, and wherein said at least one conductive component is comprised of at least two conductive components, and wherein one of said at least two conductive components is asymmetrically shaped with respect to another of said at least two conductive components, and wherein said at least two conductive components act as a dipole antenna when receiving said electronic signal having a first frequency, and wherein said at least two conductive components couple to said slot to form a slot antenna when receiving said electronic signal having a second frequency different than said first frequency.

9. The system of claim 8, wherein said slot contains a plurality of self-terminating lengths, wherein said at least two conductive components couple to said slot having a first length to form a slot antenna when receiving said electronic signal having said second frequency, and said at least two conductive components couple to said slot having a second length to form a slot antenna when receiving said electronic signal having a third frequency different than said first and second frequencies.

10. The system of claim 5, wherein said at least one conductive component is comprised of two conductive components that couple to at least one belt from said plurality of conductive belts and to a bead on said tire that form a slot operating as a slot antenna, and wherein said slot between said at least one belt and said bead forms a transmission line for receiving a signal radiated by an interrogation reader to said slot antenna.

11. The system of claim 1, wherein said at least one conductive belt is constructed from a material comprised from the group consisting of steel, iron, and aluminum.

12. The system of claim 1, wherein said at least one antenna pin is capacitively coupled to said at least one conductive belt to form a monopole antenna.

13. The system of claim 12, wherein said RFID chip further comprises a ground pin that is coupled to a ground plane to provide a ground for said RFID chip.

14. The system of claim 1, wherein said antenna operates at an operating frequency comprised from the group consisting of UHF and VHF.

15. The system of claim 1, wherein said RFID chip operates at an operating frequency from the group consisting of 2.45 GHz, 869 MHz, 915 MHz, and 13.56 MHz.

16. The system of claim 1, further comprising a nonconductive adhesive that is placed in between said RFID chip and said inner surface to adhesively couple said RFID chip to said inner surface.

17. The system of claim 1, wherein said RFID chip wirelessly communicates information concerning said tire, using said antenna, to an interrogation reader.

18. The system of claim 17, wherein said information concerning said tire is comprised from the group consisting of pressure of said tire, temperature of said tire, ambient pressure around said tire, and ambient temperature around said tire.

19. A system for communicating information wirelessly with a tire, comprising:
 a tire that includes:
  an elongated planar surface having an inner side and an outer side forming a circular shape, wherein said elongated planar surface comprises a first outer edge and a second outer edge opposite of said first outer edge;
  a first planar side that connects to said first outer edge to form a first inner wall; and
  a second planar side that connects to said first outer edge to form a second inner wall;
  said first planar side having embedded within at least one conductive belt to add structural integrity to said tire; and
 a RFID chip having at least one antenna pin, wherein said RFID chip is attached to said first inner wall of said tire and wherein said first planar side forms a dielectric between said at least one conductive belt and said RFID chip;
 said at least one antenna pin capacitively coupled to said at least one conductive belt to form an antenna for radio-frequency signal communication to and from said RFID chip.

20. A system for communicating information wirelessly with a tire, comprising:
 a tire that includes:
  an elongated planar surface having an inner side and an outer side forming a circular shape, wherein said elongated planar surface comprises a first outer edge and a second outer edge opposite of said first outer edge;
  a first planar side that connects to said first outer edge to form a first inner wall; and
  a second planar side that connects to said second outer edge to form a second inner wall;
  said second planar side having embedded within at least one conductive belt to add structural integrity to said tire; and
 a RFID chip having at least one antenna pin, wherein said RFID chip is attached to said second inner wall of said tire and wherein said second planar side forms a dielectric between said at least one conductive belt and said RFID chip;
 said at least one antenna pin capacitively coupled to said at least one conductive belt to form an antenna for radio-frequency signal communication to and from said RFID chip.

21. A method of wirelessly communicating information concerning a tire, comprising:
 attaching a RFID chip having at least one antenna pin inside a tire;
 capacitively coupling said at least one antenna pin to at least one conductive belt contained inside said tire to form an antenna for radio-frequency communications; and
 receiving a radio-frequency signal through said antenna.

22. The method of claim 21, further comprising backscattering said radio-frequency signal received through said antenna.

23. The method of claim 21, further comprising transmitting a separate radio-frequency signal through said antenna.

24. The method of claim 21, wherein said at least one conductive belt is comprised of a plurality of conductive belts.

25. The method of claim 24, wherein said capacitively coupling further comprises capacitively coupling said at least one antenna pin to a slot formed by said conductive belts to form a slot antenna.

26. The method of claim 24, wherein said at least one antenna pin is comprised of two antenna pins and wherein said step of capacitively coupling further comprises capacitively coupling said two antenna pins to said plurality of conductive belts to form a dipole antenna for radio-frequency communications.

27. The method of claim 21, further comprising grounding said RFID chip.

28. The method of claim 21, further comprising:
 attaching at least one conductive component to said antenna pin, wherein said at least one conductive belt is comprised of a plurality of conductive belts having a slot formed between said plurality of conductive belts; and
 wherein said capacitively coupling further comprises capacitively coupling said at least one conductive component to said slot to form said antenna.

29. The method of claim 28, further comprising generating an electric field across said slot to capacitively couple said electric field to said at least one conductive component.

30. The method of claim 28, wherein said at least one conductive component comprises two conductive components, and further comprising:
 receiving a signal having a first operating frequency using said slot antenna; and
 receiving a signal having a second operating frequency using said two conductive components as a dipole antenna.

31. The method of claim 30, further comprising arranging said two conductive components asymmetrically with respect to each other.

32. The method of claim 21, wherein said at least one conductive component comprises two conductive components, and further comprising:
 attaching said two conductive components between said at least one conductive belt and a bead on said tire forming a slot to form a slot antenna; and
 receiving an electronic signal sent by an interrogation reader that is radiated through said slot formed between said at least one conductive belt and said bead.

* * * * *

UNITED STATES PATENT AND TRADEMARK OFFICE
CERTIFICATE OF CORRECTION

PATENT NO. : 7,050,017 B2
APPLICATION NO. : 10/223065
DATED : May 23, 2006
INVENTOR(S) : P.F. King et al.

It is certified that error appears in the above-identified patent and that said Letters Patent is hereby corrected as shown below:

| COLUMN | LINE | ERROR |
|---|---|---|
| Title Page (57) Pg. 1, col. 2 | Abstract line 7 of text | "capacitvely" should read --capacitively-- |
| 3 | 22 | "source, antenna connections," should read --source; or used for antenna connections-- |
| 3 | 41 | "transponder" should read --"transponder"-- |
| 5 | 34 | "place" should read --placed-- |
| 5 | 62 | "a antenna" should read --antenna-- |
| 6 | 4 | "Note, that" should read --Note that-- |
| 7 | 47 | "forming" should read --form-- |
| 7 | 49 | "providing" should read --provide-- |
| 8 | 32 | after "6,501,435." insert paragraph --In one mode of operation, when a signal 36 is radiated at a first operating frequency, the RFID chip 10 and its conductive components 80A, 80B are configured to form an asymmetric dipole antenna 16. The conductive components 80A, 80B are tuned to treat the belts 74 as effectively continuous conductors to form a dipole antenna at such first operating frequency, wherein the belts 74 radiate upwards towards the wheel (not shown) of the tire 50. For example, the conductive components 80A, 80B may be designed to operate at an operating frequency of 2.45 GHz.-- |
| 8 | 38 | "belts 78" should read --belts 74-- |

UNITED STATES PATENT AND TRADEMARK OFFICE
CERTIFICATE OF CORRECTION

PATENT NO. : 7,050,017 B2
APPLICATION NO. : 10/223065
DATED : May 23, 2006
INVENTOR(S) : P.F. King et al.

It is certified that error appears in the above-identified patent and that said Letters Patent is hereby corrected as shown below:

| COLUMN | LINE | ERROR |
|---|---|---|
| 9 | 20 | "signal's 36" should read --signal 36's-- |

Signed and Sealed this

Twenty-fifth Day of December, 2007

JON W. DUDAS
*Director of the United States Patent and Trademark Office*